P. S. MARTIN.
GREASE RETAINER.
APPLICATION FILED JULY 27, 1916.
1,218,439.
Patented Mar. 6, 1917.
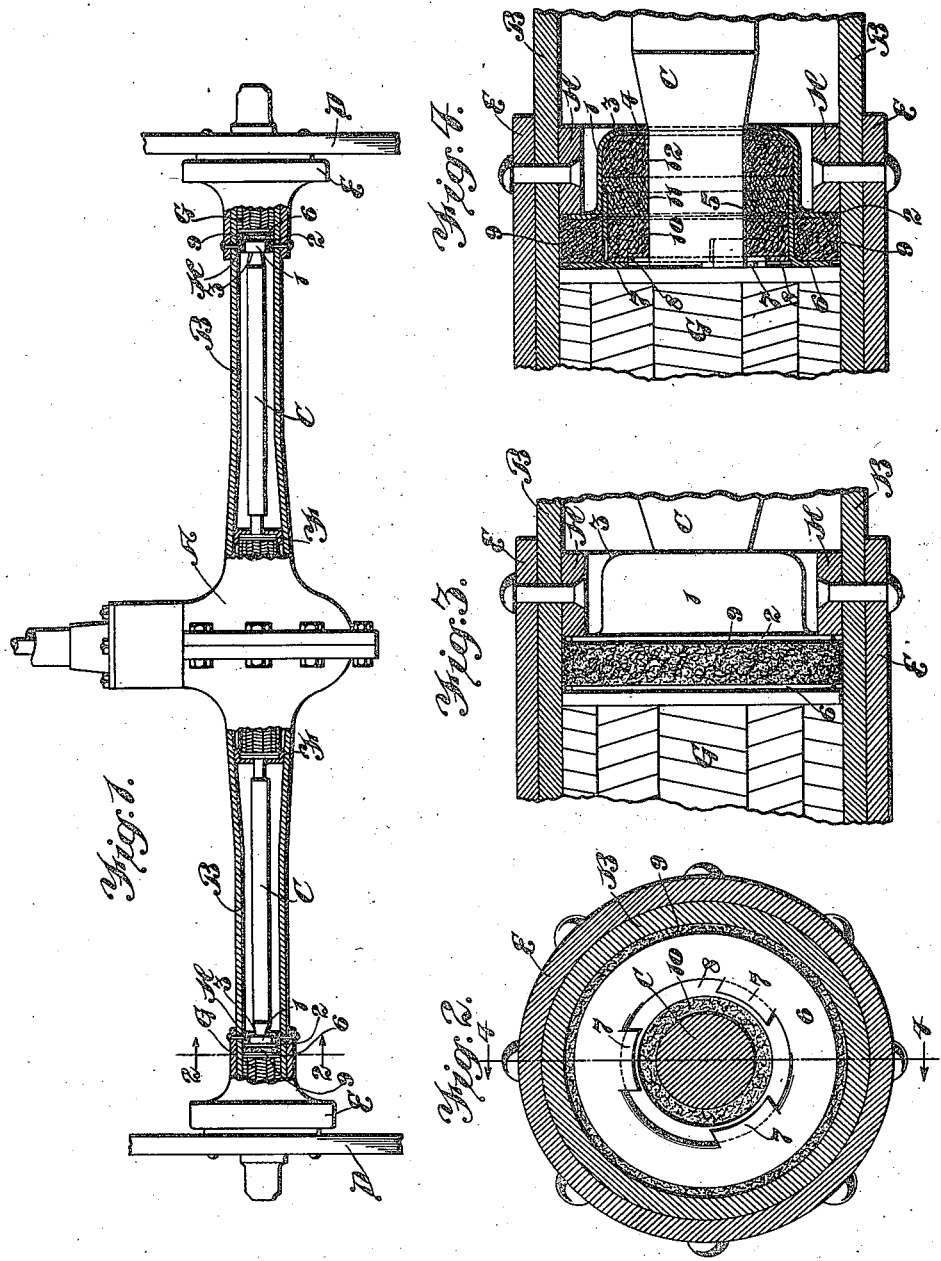
WITNESS.
Charles A. Becker.
INVENTOR.
Philip S. Martin,
BY Ralph Kalish
HIS ATTORNEY.

UNITED STATES PATENT OFFICE.

PHILIP S. MARTIN, OF CLAYTON, MISSOURI.

GREASE-RETAINER.

1,218,439.  Specification of Letters Patent.  Patented Mar. 6, 1917.

Application filed July 27, 1916. Serial No. 111,645.

*To all whom it may concern:*

Be it known that I, PHILIP S. MARTIN, a citizen of the United States, residing at Clayton, county of St. Louis, State of Missouri, have invented a certain new and useful Improvement in Grease-Retainers, of which the following is a specification, reference being had to the accompanying drawing, forming a part thereof.

This invention relates to a certain new and useful improvement in grease-retainers especially adapted for use in connection with the rear axle assembly of automobiles and the like, the chief objects of my present invention being to provide a simple and inexpensive grease-retainer of few, readily replaced parts which may be conveniently and easily arranged or mounted operatively in the rear axle assembly of the car and which, when in operative position, is adapted to efficiently prevent the escape or leakage at the ends of the axle-housing of grease, oil, or other lubricant supplied or furnished to the inclosed differential and driving-gears of the machine, and to improve generally upon, and simplify the construction of, grease-retainers of the class described.

With the above and other objects in view, my invention resides in certain novel features of form, construction, arrangement, and combination of parts, all as will hereinafter be described and afterward pointed out in the claims.

In the accompanying drawing, which illustrates my invention in preferred form,

Figure 1 is an elevational view, partly in section, of the rear axle assembly of an automobile equipped with grease-retainers embodying my invention;

Fig. 2 is an enlarged sectional view through the same on approximately the line 2—2, Fig. 1;

Fig. 3 is an enlarged fragmentary view of the same, showing my new grease-retainer in side elevation; and Fig. 4 is a sectional view on approximately the line 4—4, Fig. 2.

Referring to the said drawing, in which like reference-characters refer to like parts throughout the several views, I have, for purposes of illustration, shown my new grease-retainer in connection with a rear axle assembly of the Ford type, although it is to be understood that the grease-retainer might equally well be employed with rear axle assemblies of other types. In the type of assembly shown, A indicates the differential and driving-gear housing, B the live-axle housing or dead axle, as it is commonly termed, C—C the live axles rotatable within housing B, D—D the rear wheels rotatable with axles C—C, E—E the brake drums, and F—F and G—G suitable roller bearings for the axles C—C. Riveted or otherwise fixed within the housing B adjacent its outer ends, are suitable rings or the like H—H adapted to provide shoulders against which the outer roller-bearings G—G ordinarily abut. I, however, as shown and as hereinafter more fully appears, suitably place or insert my new grease-retainers within the housing B between the rings or shoulders H—H and the outer roller-bearings G—G; and since the construction is similar at both outer ends of the housing B, I have shown in detail and will describe only the construction at the left-hand end (reference being had to Fig. 1) of the axle-assembly.

My new grease-retainer includes a cup-shaped member 1 provided at its rim with an annular outwardly-projecting or laterally-disposed washer-retaining flange 2. Member 1 is cut-away within the area of its end face 3 to provide a circular aperture, as at 4, to suitably accommodate axle C, member 1 being adapted to fit approximately concentrically upon axle C, as seen particularly in Fig. 4, with the inner or under face of its flange 2 abutting against or bearing upon the shoulder or ring H.

Coöperating with member 1, is a separate relatively small tubular or cylindrical member 5 adapted also to fit approximately concentrically upon axle C and of such diameter as to slidably fit within the body of member 1, as also seen particularly in Fig. 4, this member 5 being also provided at one, or its outer, edge with an annular outwardly-projecting or laterally-disposed washer-retaining flange 6. At its said outer edge and at the base of its flange 6, member 5 is punched, upset, or otherwise preferably integrally provided with a plurality of spaced apart lips or the like 7, the lips 7 projecting into the area of member 5 and being approximately in alinement or flush with the flange 6, as seen in Figs. 2 and 4. Loosely fitting within member 5 and prevented from outward movement relatively thereto by the lips or projections 7, is a washer-retaining ring 8.

Fitting upon the periphery of member 5 and disposed operatively between said flanges 2 and 6, is a washer 9 of felt or other suitable material, this washer 9 being of such size or diameter as to engage at its outer circumference or periphery, when the grease-retainer is in operative position upon axle C and within housing B, upon the inner surface of housing B. And fitting within members 1 and 5 and disposed between end face 2 of member 1 and ring 8 of member 5, is a quantity of felt or other suitable material preferably in the form of a plurality of separate rings or washers 10, 11 and 12 adapted to engage or impinge at their inner circumference, also when the grease-retainer is in operative position on axle C and within housing B, upon axle C, as shown.

In use or operation, the grease-retainer with its several parts in either assembled or disassembled relation may be readily and conveniently mounted or arranged operatively within the housing B. For instance, a wheel D and bearing G being removed or dismounted, members 1 and 5 with an outer washer 9 retained between flanges 2 and 6 and inner washers 10, 11, and 12 retained between ring 8 and end-face 3, member 5 suitably fitting at its inner end within the body-portion of member 1, may be operatively slidably fitted together upon the axle C; or a member 1 may be first slidably fitted upon the axle and then, in turn, inner washers 10, 11, and 12, and a member 5 with a washer 9 disposed thereupon slidably fitted upon the axle. In either case, on the bearing G and wheel D being again mounted and secured upon the axle, the grease-retainer J will be correspondingly securely held in operative position upon the axle and within the housing B, the member 1 abutting or engaging at the inner or under face of its flange 2 against the fixed shoulder or ring H and outer grease-washer 9 and inner grease-washers 10, 11, and 12 being, respectively, compressed between, and compactly and firmly held in operative wiping engagement with the inner surface of housing B and the periphery of axle C by, the flanges 2 and 6 and the ring 8 and end face 3 of the relatively rigid metallic members 1 and 5. And when in such operative position, it will be evident that the outer and inner grease-washers not only prevent any wearing contact or engagement between the housing B and axle C and the metallic parts of the grease-retainer, but also efficiently prevent any flow or escape at the ends of the housing B of grease, oil, or other lubricant supplied or furnished to the movable parts mounted within the housings A and B. My new grease-retainer as shown and described has but few parts, and it will be obvious that, in the event of wear or breakage of any of the parts, repairs or replacement may be made without difficulty.

I am aware that minor changes in the form, construction, arrangement, and combination of the several parts of my new grease-retainer may be made and substituted for those herein shown and described without departing from the nature and principle of my invention.

Having thus described my invention, what I claim and desire to secure by Letters Patent is:

1. In a grease-retainer of the class described, a cup-shaped member apertured in its end face, said member being provided with an outwardly-projecting annular flange, a tubular member also provided with an outwardly-projecting annular flange, and a grease-washer fitting on the tubular member and operatively disposed between said flanges.

2. In a grease-retainer of the class described, a cup-shaped member apertured in its end face, said member being provided with an outwardly-projecting annular flange, a tubular member also provided with an outwardly-projecting annular flange, an outer grease-washer fitting on the tubular member and operatively disposed between said flanges, the tubular member loosely fitting at its inner end within the cup-shaped member, and an inner grease-washer operatively disposed within said members.

3. In a grease-retainer of the class described, a cup-shaped member apertured in its end face, said member being provided with an outwardly-projecting annular flange, a tubular member also provided with an outwardly-projecting annular flange, an outer grease-washer fitting on the tubular member and operatively disposed between said flanges, the tubular member loosely fitting at its inner end within the cup-shaped member, a ring within the tubular member, and an inner grease-washer disposed within said members between said ring and the end-face of the cup-shaped member.

4. In a grease-retainer of the class described, a cup-shaped member apertured in its end face, said member being provided with an outwardly-projecting annular flange, a tubular member also provided with an outwardly-projecting annular flange, an outer grease-washer fitting on the tubular member and operatively disposed between said flanges, the tubular member loosely fitting at its inner end within the cup-shaped member, a ring loosely fitting within the tubular member, projections on the tubular member to hold said ring against movement through the outer end of said tubular member, and an inner grease-washer operatively disposed within said members between said ring and the end-face of the cup-shaped member.

5. In a grease-retainer of the class described, a tubular outer grease-washer supporting member, a washer-retaining ring disposed loosely within said member, and a plurality of inwardly projecting integral lips on said member adapted to hold the ring from outward movement through one end of the member.

6. In a grease-retainer of the class described, a tubular outer grease-washer supporting-member, an outwardly-projecting annular washer-retaining flange on said member, a washer-retaining ring loosely disposed within said member, and a plurality of inwardly projecting integral lips on said member approximately in alinement with said flange, said lips being adapted to hold said ring from outward movement through one end of said member.

In testimony whereof, I have signed my name to this specification.

PHILIP S. MARTIN.